(12) United States Patent
Wu

(10) Patent No.: US 9,733,768 B2
(45) Date of Patent: Aug. 15, 2017

(54) DISPLAY APPARATUS WITH TOUCH SENSOR COMPRISING FIRST AND SECOND SENSING LINES HAVING A PLURALITY OF CROSSING POINTS THAT COMPRISE A PLURALITY OF DISCONNECTING POINTS

(71) Applicant: Innolux Corporation, Miao-Li County (TW)

(72) Inventor: Ching-Hsin Wu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 238 days.

(21) Appl. No.: 14/297,673

(22) Filed: Jun. 6, 2014

(65) Prior Publication Data
US 2015/0015806 A1    Jan. 15, 2015

(30) Foreign Application Priority Data

Jul. 10, 2013  (TW) .............................. 102124726 A

(51) Int. Cl.
*G06F 3/044*  (2006.01)
(52) U.S. Cl.
CPC .... *G06F 3/044* (2013.01); *G06F 2203/04103* (2013.01)
(58) Field of Classification Search
CPC ..................... G06F 1/1643; G06F 2203/04103
See application file for complete search history.

(56) References Cited

U.S. PATENT DOCUMENTS

| 7,940,251 | B2  | 5/2011  | Hashida |
| 2008/0158199 | A1* | 7/2008 | Lee ...................... G02F 1/13338 345/174 |
| 2008/0239214 | A1* | 10/2008 | Lee ...................... G02F 1/13338 349/106 |
| 2011/0084857 | A1* | 4/2011 | Marino .................. G06F 3/044 341/5 |
| 2012/0162089 | A1* | 6/2012 | Chang ................... G06F 3/0412 345/173 |

(Continued)

FOREIGN PATENT DOCUMENTS

| CN | 101266531 A | 9/2008 |
| CN | 102576272 A | 7/2012 |

OTHER PUBLICATIONS

SIPO Office Action dated Nov. 28, 2016 in Chinese application (No. 201310288891.0).

*Primary Examiner* — Paul Lee
(74) *Attorney, Agent, or Firm* — McClure, Qualey & Rodack, LLP

(57) ABSTRACT

A display apparatus with touch sensor at least includes a display module and a touch-sensing module coupled to the display module. The display module comprises a first substrate, a second substrate and a display medium layer disposed therebetween. The touch-sensing module comprises a first electrode layer, a second electrode layer and a third electrode layer. The first electrode layer comprises plural first driving electrodes arranged along a first direction, and the second electrode layer comprises plural second driving electrodes arranged along a second direction, wherein the first and second directions are intersected. The third electrode layer comprises plural sensing electrodes which are electrically connected to each other.

23 Claims, 5 Drawing Sheets

(56) References Cited

U.S. PATENT DOCUMENTS

2012/0162104 A1\* 6/2012 Chang ................... G06F 3/0412
 345/173
2012/0274603 A1\* 11/2012 Kim ...................... G06F 3/0412
 345/174
2012/0326990 A1\* 12/2012 Wurzel ................. G06F 1/1658
 345/173

\* cited by examiner

DISPLAY APPARATUS WITH TOUCH SENSOR COMPRISING FIRST AND SECOND SENSING LINES HAVING A PLURALITY OF CROSSING POINTS THAT COMPRISE A PLURALITY OF DISCONNECTING POINTS

This application claims the benefit of Taiwan application Serial No. 102124726, filed Jul. 10, 2013, the subject matter of which is incorporated herein by reference.

BACKGROUND

Technical Field

The disclosed embodiments relate in general to a display apparatus with touch sensor and a method for manufacturing the same, and more particularly to a display apparatus with capacitive touch sensor and a method for manufacturing the same.

Description of the Related Art

Today, electronic products with displays, such as smart phones, tablet personal computers (i.e. tablet PC, flat PC, ex: iPad), laptops, monitors, and televisions, are necessary tools for work and leisure in the daily life. Besides requiring the excellent electrical characteristics of the electronic products such as the higher display quality, faster speed of response, longer useful life and more steady operation state, consumers would also expect more additional functions. Touch panels have been widely used in the applications of portable electronic products, which is a unique interactive viewing screen for the users. Typically, a touch panel is equipped on the front surface of a display apparatus, which allows the user to interact with the device easily; for example, to respond messages by touching the screen at the position corresponding to the query shown on the display, to select listed items on the menu shown on the display, to scroll the listed items, or to provide a free input format such as drawing an object and/or inputting words on the display by handwriting.

A capacitive touch screen is a unique interactive viewing screen which supports multi-touch by gently pinching and provides good experiences for the users (ex: allow pinching and stretching gestures on the screen to control zooming); therefore, the capacitive touch screen has become the commonly use in the consumer electronic products such as smart phones and tablets.

There are a variety of touch screen technologies that have different methods of sensing touch. Based on their driving designs, touch screens can be divided into the following types: resistive touch screen, optical touch screen, capacitive touch screen, and electromagnetic touch screen. A capacitive touch screen is a unique interactive viewing screen which supports multi-touch by gently pinching and provides good experiences for the users (ex: allow pinching and stretching gestures on the screen to control zooming); therefore, the capacitive touch screen has become the commonly use in the consumer electronic products such as smart phones and tablets.

Based on the positions of touch screens, display apparatus with touch sensor can be divided into the following types: out-cell, on-cell and in-cell touch-sensing display apparatuses. The out-cell touch-sensing display apparatus comprises a touch screen stacked on a display panel without touch function. The on-cell touch-sensing display apparatus comprises a touch sensor integrated on the upper surface of a CF substrate. The in-cell touch-sensing display apparatus comprises a touch sensor integrated inside the display panel. Due to the elimination of bulky touch screens attached to the display panels, the on-cell and in-cell touch-sensing display apparatuses, with less glass substrates and thickness of films, have slim appearances and light weight.

FIG. 1A illustrates a display apparatus with touch sensor. The display apparatus 1 with touch sensor comprises a display module 11, a touch-sensing module 13 and a controlling module 15. The touch-sensing module 13 coupled to the display module 11 is disposed in front of the display module 11 to provide a touch-sensitive surface for the user. The controlling module 15 receives signals from the touch-sensing module 13 and provides signals for driving display module 11. FIG. 1B illustrates a conventional capacitive display apparatus having driving electrodes and sensing electrodes. The touch sensing display apparatus typically has multi-touch sensing arrangement to detect and monitor multiple touch attributes (including, for example, identification, position, velocity, size, shape, and magnitude) across the touch sensitive surface 130. A display module of the capacitive touch sensing display apparatus comprises plural sensing electrodes 131 and driving electrodes 133 separated by a non-conductive layer, and the sensing electrodes 131 and the driving electrodes 133 are respectively coupled to the sense circuit 132 and the drive circuit 134. The drive circuit 134 sends driving signals to the driving electrodes 133, and the sense circuit 132 receives multi-touch sensing points provided by the touch sensitive surface 130. In the fabrication, the transparent conductive lines (shaped as rhombus patterns) as the sensing electrodes 131 and the driving electrodes 133 perpendicularly at different layers are formed on an ITO substrate. An object (e.g., finger, stylus, etc.) in contact with or in proximity to touch-sensitive surface 130 can induce the change of the coupling capacitance between the sensing electrodes 131 and the driving electrodes 133, and produce contact patch point (or area). According to the analysis, calculation and process of the controlling module 15, the sensing points on the touch-sensitive surface 130 are mapped into a coordinate system, thereby determining the positions of the contact patch point (or area).

However, the current multi-touch sensing arrangement, as illustrated in FIG. 1B with x-y dual axes of electrodes at driving end and receiving end, takes a long time to complete the driving processing. The driving lines are driven one at a time, while the other driving lines are grounded; this process is repeated orderly from upper to lower or lower to upper until all driving lines have been driven. Positions of touch points on the touch-sensitive surface 130 are determined according to received signals in orders. Once all the lines have been driven, the sequence can repeat to build a series of touch images. This current driving method as described above is a time-consuming processing method.

SUMMARY

The disclosure is directed to a display apparatus with touch sensor and a method for manufacturing the same. A touch-sensing module of the embodied display apparatus comprises one receiver and a structure including electrodes in three axes to receive signal, which simplifies signal analysis, calculations and coordinate transformations.

According to one embodiment, a display apparatus with touch sensor is provided, comprising a display module and a touch-sensing module coupled to the display module. The display module at least comprises a first substrate, a second substrate and a display medium layer disposed between the first substrate and the second substrate. The touch-sensing module comprises a first electrode layer having a plurality of first driving electrodes arranged along a first direction, a second electrode layer having a plurality of second driving electrodes arranged along a second direction, and a third electrode layer having a plurality of sensing electrodes electrically connected to each other. The first direction and the second direction are intersected.

Figure 1A:
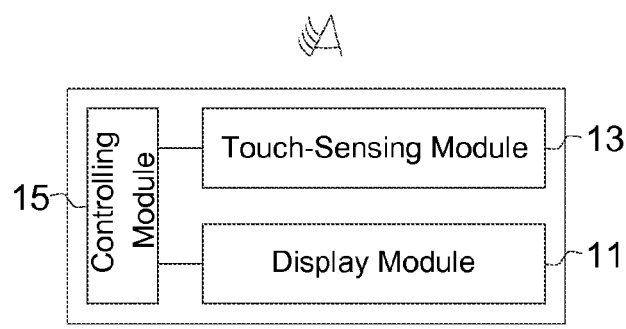
FIG. 1A (Prior Art) illustrates a display apparatus with touch sensor.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

In the embodiment, a display apparatus with touch sensor and a method for manufacturing the same are provided, and a touch-sensing module of the embodied display apparatus has a structure including electrodes in three axes. Compared to the conventional touch-sensing module including several receivers, only one receiver (i.e. the sensing electrodes C electrically connected to each other) is required for a touch-sensing module of the embodied display apparatus to receive signals. It is much simpler of the embodied display apparatus to analyze signals and calculate position for coordinate transformations, which makes the display apparatus respond more quickly.

Embodiments are provided hereinafter with reference to the accompanying drawings for describing the related configurations, but the present disclosure is not limited thereto. Also, it is noted that there may be other embodiments of the present disclosure which are not specifically illustrated. It is also important to point out that the illustrations may not be necessarily be drawn to scale. Thus, the specification and the drawings are to be regard as an illustrative sense rather than a restrictive sense.

Figure 1B:
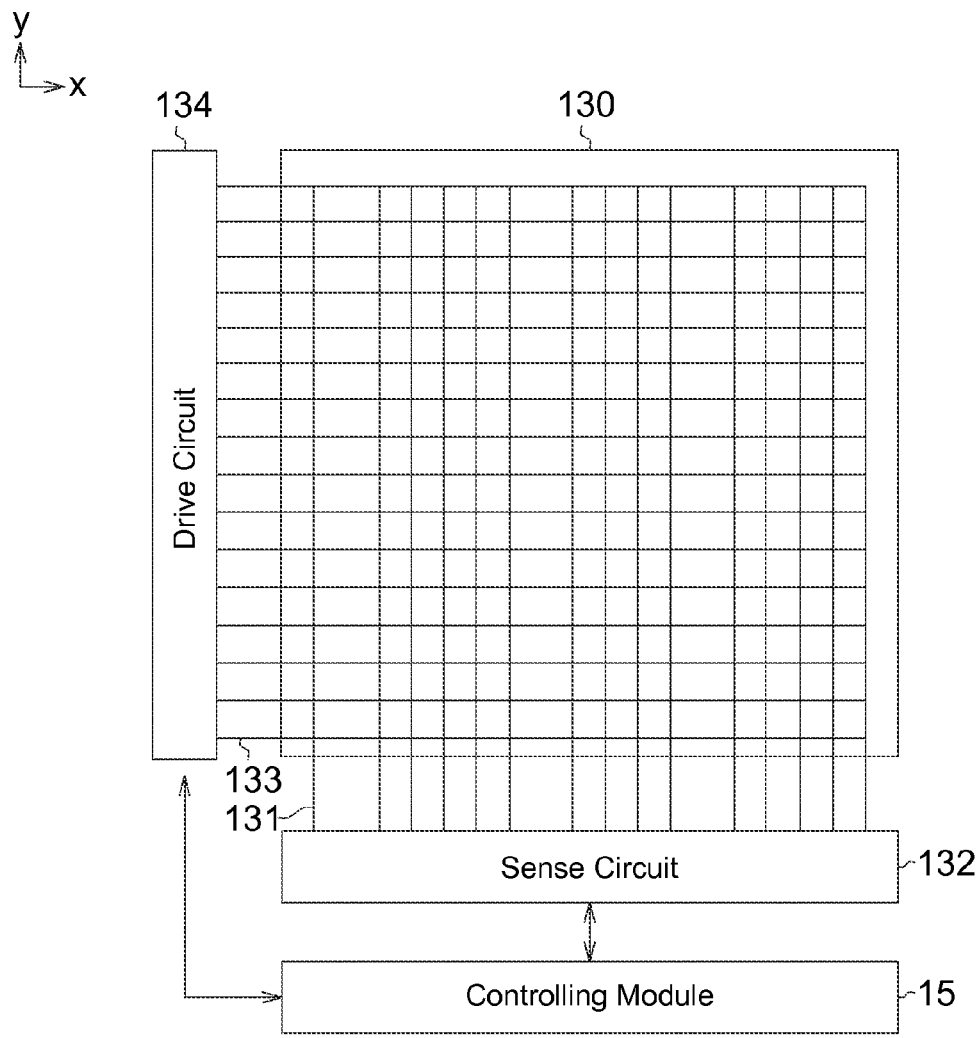
FIG. 1B (Prior Art) illustrates a conventional capacitive display apparatus having driving electrodes and sensing electrodes.
Figure 2:
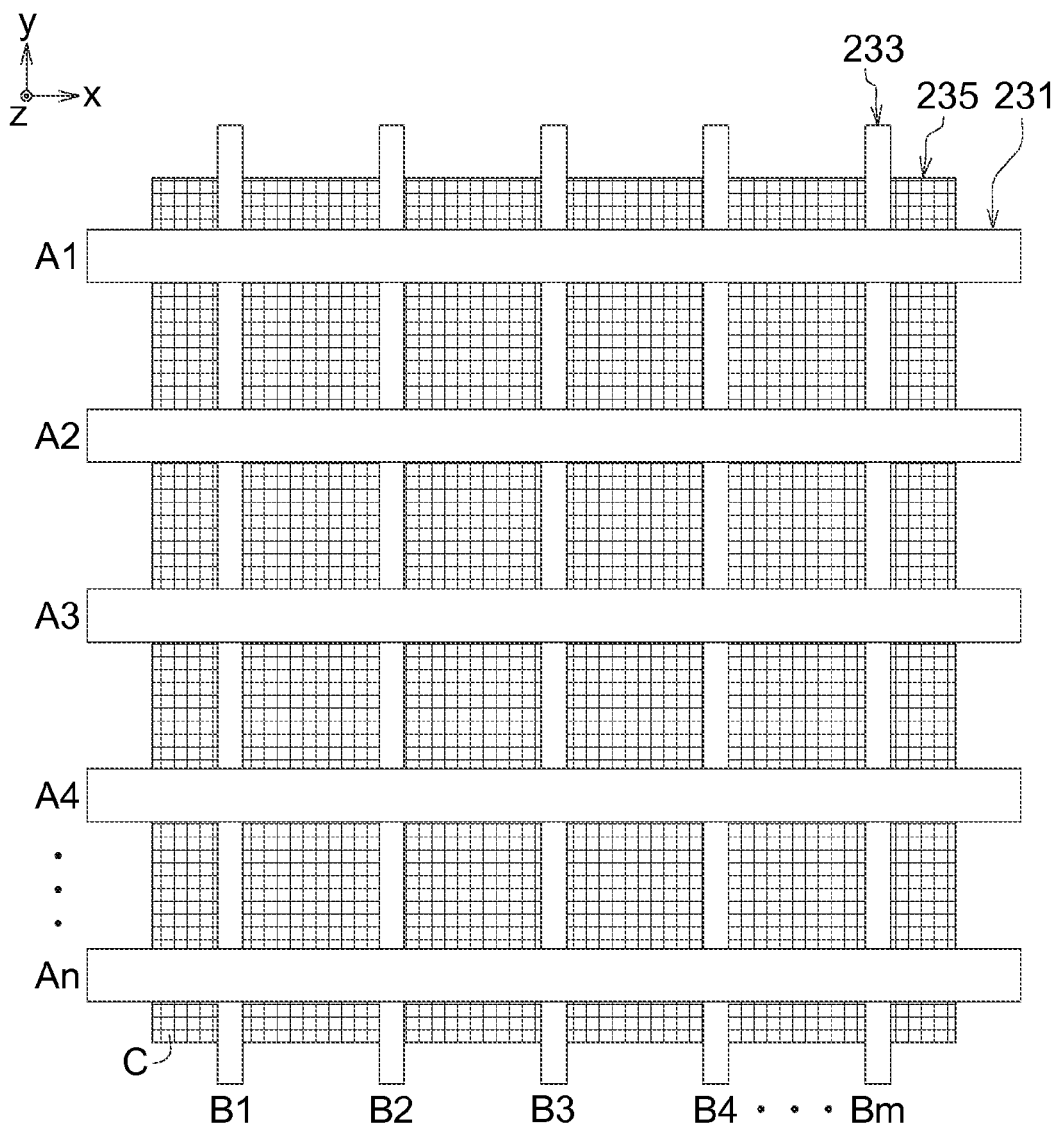
FIG. 2 is a top view of a touch-sensing module including electrodes in three axes according to one embodiment of the display apparatus of the disclosure.

As shown in FIG. 1, the display apparatus with touch sensor of the embodiment comprises a display module 11, a touch-sensing module 13 coupled to the display module 11, and a controlling module 15 receiving signals from the touch-sensing module 13 and providing signals for driving display module 11. FIG. 2 is a top view of a touch-sensing module including electrodes in three axes according to one embodiment of the display apparatus of the disclosure. The touch-sensing module has three electrode layers formed in different layers, including a first electrode layer 231, a second electrode layer 233 and a third electrode layer 235. The first electrode layer 231 comprises a plurality of first driving electrodes A1·A2·A3·A4 . . . An (n is a positive integer), and the first driving electrodes function substantially independently and are arranged along a first direction. The second electrode layer 233 comprises a plurality of second driving electrodes ·B1·B2·B3·B4 . . . Bm (m is a positive integer), and the second driving electrodes function substantially independently and are arranged along a second direction, wherein the first direction and the second direction are intersected. The third electrode layer 235 comprises a plurality of sensing electrodes C electrically connected to each other. As shown in FIG. 2, the coupled sensing electrodes C present a short circuit condition. In one embodiment, the sensing electrodes C are arranged along a third direction.

In one embodiment, the first driving electrodes A1·A2·A3·A4 . . . An are arranged along the y-direction (i.e. the first direction), the second driving electrodes B1·B2·B3·B4 . . . Bm are arranged along the x-direction (i.e. the second direction), wherein the first direction is substantially perpendicular to the second direction. The sensing electrodes C are extended along the z-direction (i.e. the third direction). The first, second and third directions constitute a combination of three axes of x-y-z. In the embodiment, the sensing electrodes C may be configured as a grid-shaped pattern, or a strip-shaped pattern or other applicable patterns, which are not limited particularly.

It is, of course, noted that the arrangement of the driving electrodes can be varied; for example, the first and second driving electrodes are arranged along the x-direction and the y-direction respectively. Also, it is not necessary that the first and second driving electrodes are perpendicular to each other. In other embodiments, the first and second driving electrodes can be intersected at an angle, or be parallel to each other. Relative x and y coordinate of one or more the touch points can be rapidly determined by a controlling module incorporated with a suitable algorithm.

The display apparatus with touch sensor of the embodiments can be applied to various types of display apparatuses, such as out-cell, on cell, in-cell and hybrid touch display apparatuses. The applicable types of the display apparatuses and positions of the electrode layers of the disclosure are not particularly limited.

There is no particular limitation to formation of these three electrode layers in the embodiment. The first electrode layer 231, the second electrode layer 233, and the third electrode layer 235 can be formed separately on its own base plate, and the electrodes in three axes of the embodiment can be created by combining those base plates with electrodes. Alternatively, any two of three electrode layers are formed on one base plate, and combined with another base plate having the remaining electrode layer to create electrodes in three axes of the embodiment. Alternatively, three electrode layers can be formed on one base plate layer by layer (ex: by dividing the conductive patterns into three different layers), wherein the stacking order of three electrode layers is not particularly limited. For example, the first electrode layer 231, the second electrode layer 233 and the third electrode layer 235 can be the stacked from the upper to the lower, or from the lower to the upper. Alternatively, the electrode layers can be formed on both sides of the base plate. A base plate having two electrode layers respectively formed on the front side and the rear side can be assembled with the other base plate having one electrode layer to form a structure including electrodes in three axes.

The base plate described herein can be referred to a substrate outside the display module for making the touch-sensing module (i.e. for out-cell application), or can be a color filter (CF) substrate of the display module (i.e. for on-cell application) which the electrode layers are formed the rear sides of the CF substrate. Alternatively, the base plate described herein can be referred to an extra substrate formed with the electrode layers or a thin film transistor (TFT) substrate formed with the electrode layers, which is positioned inside the display module (i.e. for in-cell application).

According to the relative positions of three electrode layers to a base plate (ex: on the upper side or the lower side of the base plate), there are eight ($2^3$) different arrangements listed below.

| Driving electrodes A | upper side | upper side | upper side | lower side | lower side | lower side | upper side | lower side |
|---|---|---|---|---|---|---|---|---|
| Driving electrodes B | upper side | upper side | lower side | upper side | lower side | upper side | lower side | lower side |
| Sensing electrode C | upper side | lower side | lower side | lower side | upper side | upper side | upper side | lower side |

In the embodiment, the base plate can be a plate or flexible film made of a transparent material such as glass or polymers (ex: Polyethylene terephthalate, PET). The first driving electrodes A1·A2·A3·A4 . . . An of the first electrode layer 231, the second driving electrodes B1·B2·B3·B4 . . . Bm of the second electrode layer 233, and the sensing electrodes C of the third electrode layer 235 can be made of metals or ITO, which are formed by patterning procedures such as film formation and lithography.

A couple implementations of the embodiment are further described below.

Figure 3:
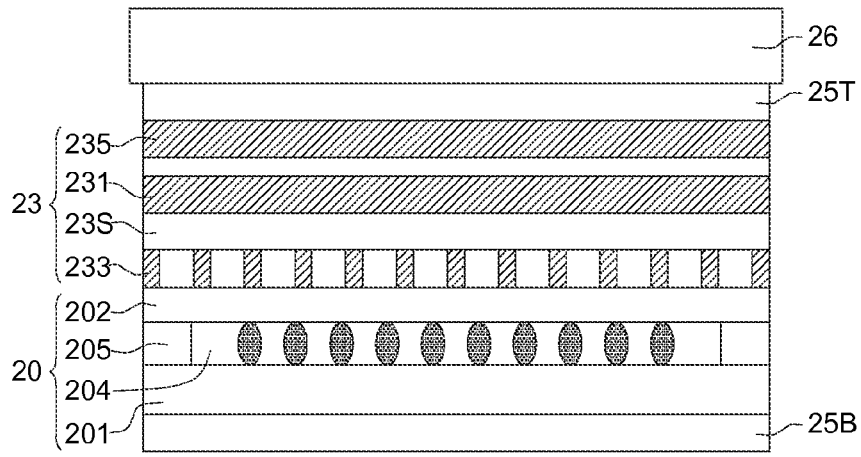
FIG. 3 is a cross-sectional view of an out-cell touch-sensing display apparatus according to one embodiment of the disclosure.

FIG. 3 is a cross-sectional view of an out-cell touch-sensing display apparatus according to one embodiment of the disclosure. The display apparatus 2 with touch sensor at least comprises a display module 20 and a touch-sensing module 23 coupled to the display module 20. The touch-sensing module 23 is disposed in front of the display module 20 to provide a touch-sensitive surface for the user. The display apparatus with touch sensor as shown in FIG. 3 illustrates one of the out-cell type touch displays.

In FIG. 3, the display module 20 at least comprises a first substrate 201, a second substrate 202 and a display medium layer 204 disposed between the first substrate 201 and the second substrate 202. In one embodiment, the first substrate 201 and the second substrate 202 are a color filter (CF) substrate and a thin film transistor (TFT) substrate respectively, and the display medium layer 204 is a liquid crystal layer. The TFT substrate and the CF substrate are adhered to each other by dispensing and curing a sealant 205 at a peripheral region outside the display region, and liquid crystals are contained in a space defined by the substrates and the sealant 205.

The touch-sensing module 23 comprises a base plate 23S outside the display module 20. The first electrode layer 231, the second electrode layer 233 and the third electrode layer 235 can be, not limitedly, formed on the same side of the base plate 23S, or on different sides of the base plate 23S (i.e. two and the remaining one of the first electrode layer 231, the second electrode layer 233 and the third electrode layer 235 are positioned at different sides of the base plate 23S). In one embodiment, the base plate 23S can be a transparent glass or a transparent polymer film such as Polyethylene terephthalate, PET). In one embodiment, the sensing electrodes C of the third electrode layer 235 can be disposed adjacent to the touch-sensing surface, to maintain the high sensitivity of the sensing electrodes C for receiving touch signals. As shown in FIG. 3, the first electrode layer 231 (comprising the first driving electrodes A1·A2·A3·A4 . . . An) and the second electrode layer 233 (comprising the second driving electrodes B1·B2·B3·B4 . . . Bm) are respectively formed on the upper and lower sides of the base plate 23S, while the third electrode layer 235 (comprising the sensing electrodes C) is formed on the first electrode layer 231.

It is, of course, to modify the positions of the electrode layers without departing from the spirit of the disclosure. For example, the first electrode layer 231 and the second electrode layer 233 can be formed on the same side of the base plate 23S, and the third electrode layer 235 (comprising the sensing electrodes C) is formed on the other side of the base plate 23S. In other embodiments, one of the electrode layers, such as the third electrode layer 235, can be fabricated on another base plate, and both base plates are then assembled to form the embodied structure including electrodes in three axes. There is no particular limitation to the positions of the electrode layers.

Additionally, the display apparatus 2 with touch sensor further comprises an upper polarizer 25T, a lower polarizer 25B and a covering layer 26. The covering layer 26 is disposed on top of the touch-sensing module 23, and can be a transparent glass or plastic, or made of other suitable transparent materials. The upper polarizer 25T is disposed between the covering layer 26 and the touch-sensing module 23, while the lower polarizer 25B is disposed on the surface of the first substrate 201. The upper polarizer 25T and the lower polarizer 25B can be subjected to suitable polarizing treatments according to requirements of practical application.

Figure 4:
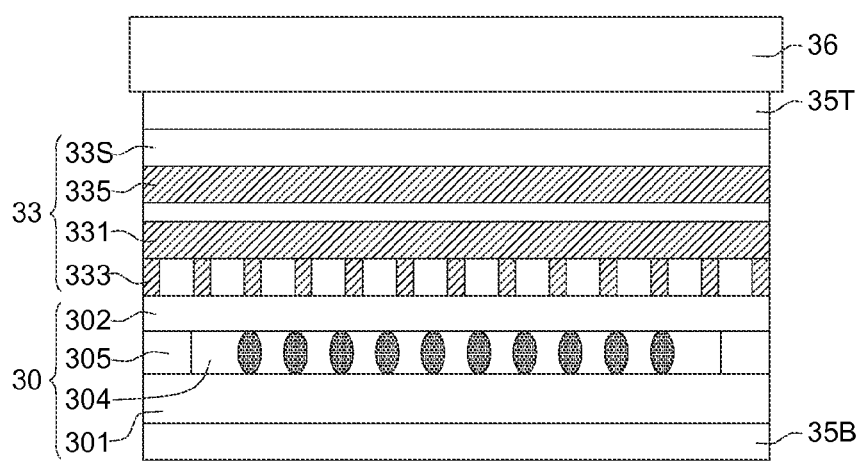
FIG. 4 is a cross-sectional view of an on-cell touch-sensing display apparatus according to one embodiment of the disclosure.

FIG. 4 is a cross-sectional view of an on-cell touch-sensing display apparatus according to one embodiment of the disclosure. The display apparatus 3 with touch sensor also comprises a display module 30 and a touch-sensing module 33 coupled to the display module 30. The display module 30 comprises a first substrate 301 (such as a TFT substrate), a second substrate 302 (such as a CF substrate) and a display medium layer 304 (such as a liquid crystal layer) disposed between the first substrate 301 and the second substrate 302. A sealant 305 is dispensed at a peripheral region outside the display region for adhering the TFT substrate and the CF substrate after curing, and liquid crystals are contained in a space defined by the substrates and the sealant 305. As shown in FIG. 4, the first electrode layer 331, the second electrode layer 333, and the third electrode layer 335 are formed on the rear side of the second substrate 302, which is opposite to the other side of the second substrate 302 facing the display medium layer 304. In one of the fabrications, two layers of the driving electrode patterns can be formed on the CF substrate (i.e. the second substrate 302) to form the first driving electrodes A1·A2·A3·A4 . . . An (i.e. the first electrode layer 331) and the second driving electrodes B1·B2·B3·B4 . . . Bm (i.e. the second electrode layer 333). The sensing electrodes C (i.e. the third electrode layer 335) are formed on a base plate 33S. An embodied structure including electrodes in three axes can be formed by assembling the base plate 33S with the CF substrate. The display apparatus with touch sensor as shown in FIG. 4 illustrates one of the on-cell type touch displays. It is noted that no particular limitation to the stacking order of the electrode layers. Other details can also be modified and changed according to actual needs of the practical applications.

Besides positioned outside the display module, the electrode layers can be positioned inside the display module. In one embodiment, the first electrode layer and the second electrode layer are positioned in the display module (ex: adjacent to the first substrate, or between the first and second substrates), while the third electrode layer is positioned at the rear side of the second substrate (i.e. the hybrid touch-sensing display apparatus) or inside the display module (i.e. the in-cell touch-sensing display apparatus).

Figure 5:
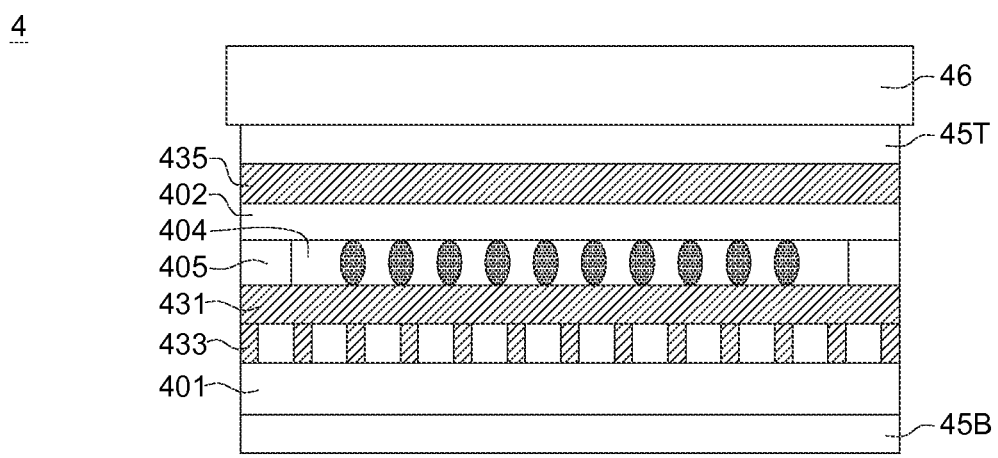
FIG. 5 is a cross-sectional view of a hybrid touch-sensing display apparatus according to one embodiment of the disclosure.

FIG. 5 is a cross-sectional view of a hybrid touch-sensing display apparatus according to one embodiment of the disclosure. A display module of the display apparatus 4 comprises a first substrate 401 (such as a TFT substrate), a second substrate 402 (such as a CF substrate), a display medium layer 404 (such as a liquid crystal layer) disposed between the first substrate 401 and the second substrate 402, and a sealant 405. In one embodiment, a touch-sensing module further comprises a conductive layer positioned between the first substrate 401 and the second substrate 402, and the conductive layer comprises the first electrode layer 431 (driving electrodes A1·A2·A3·A4 . . . An) and the second electrode layer 433 (driving electrodes B1·B2·B3·B4 . . . Bm) to transmit signals. The first metal layer (Metal-1) or the second metal layer (Metal-2) or other conductive layer can be used for implementing the first electrode layer 431 crossing over the second electrode layer 433. Then, the third electrode layer 435 can be formed at the rear side of the second substrate 402. For example, a shielding layer of an IPS (In-Plane switching) display can be patterned to form the third electrode layer 435, thereby achieving the signal receiving function of the sensing electrodes C.

Besides an extra conductive layer formed at the driving end, the current conductive pattern such as data lines, gate lines and common electrodes of the display module can be used for forming the patterns of the driving electrodes. In one embodiment, the first driving electrodes of the first electrode layer 431 and a plurality of data lines of the display module can be positioned at the same layer, while the second driving electrodes of the second electrode layer 433 and a plurality of gate lines of the display module are positioned at the same layer. If it is designed that the driving electrodes A and B of the embodiment share the portions of the data lines and the gate lines respectively, the signal scanning can be performed during the blanking time between the image displays.

An embodied structure including electrodes in three axes can be formed by assembling the driving electrodes A/B inside the display module and the sensing electrodes C outside the display module. The display apparatus with touch sensor as shown in FIG. 5 illustrates one of the hybrid type touch displays.

Moreover, position of the third electrode layer 435 can be changed to meet the design requirement. Besides at the rear side of the second substrate 402, the third electrode layer 435 can be positioned inside the display module, which is a configuration of the in-cell type touch display. Similarly, an extra conductive layer added to the driving end can be patterned to form the first electrode layer 431 (driving electrodes A1·A2·A3·A4 . . . An) and the second electrode layer 433 (driving electrodes B1·B2·B3·B4 . . . Bm) to transmit signals. Also, the first metal layer (Metal-1) or the second metal layer (Metal-2) or other conductive layer can be used for implementing the first electrode layer 431 crossing over the second electrode layer 433. Under the current structure of display module, the first electrode layer 431 and the second electrode layer 433 can be designed to share lines of the data lines and the gate lines respectively. The display module can further comprises an extra conductive layer of the receiving end (such as forming a conductive net on the black matrix) to form the third electrode layer 435 (sensing electrodes C). Alternatively, the third electrode layer 435 can be formed on a common electrode layer (Vcom) of the display module, and the common electrode layer (Vcom) also functions as the receiving end, thereby driving the signals at any time without affecting the display function of the display apparatus.

In one embodiment, the extra conductive layer added to the driving end and the conductive layer of the receiving end can be made of metal or ITO.

Additionally, in one embodiment, the sensing electrodes C of the third electrode layer 435 can be configured as a pattern of a grid, or a strip, or a special pattern for satisfying the display quality required by the application.

Figure 6A:
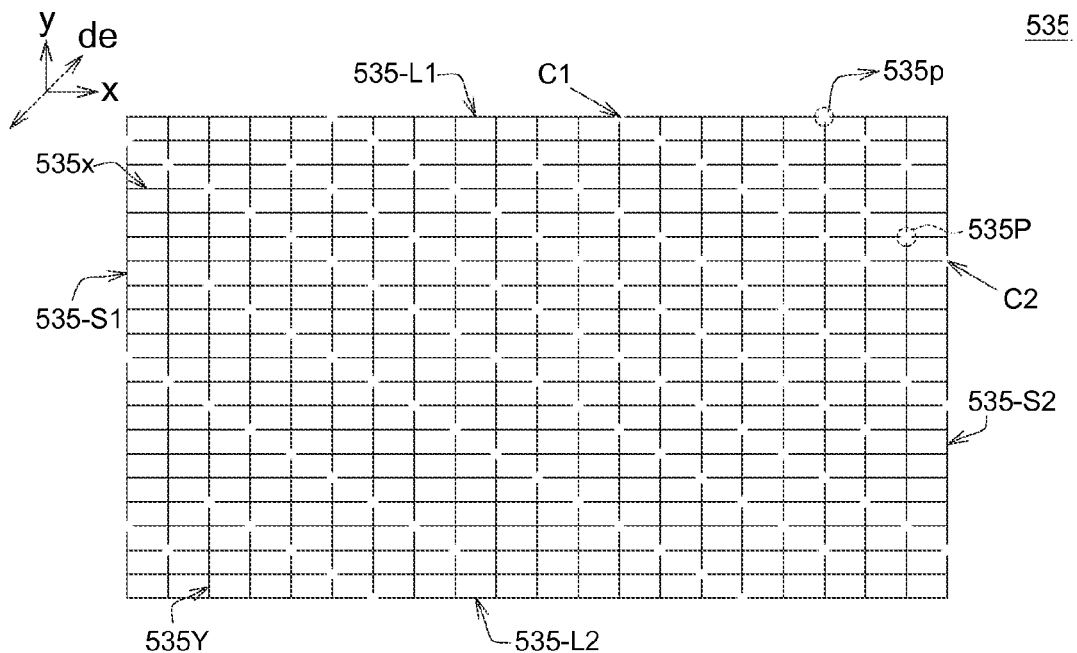
FIG. 6A is a top view of a pattern of sensing electrodes according to one embodiment of the disclosure.
Figure 6B:
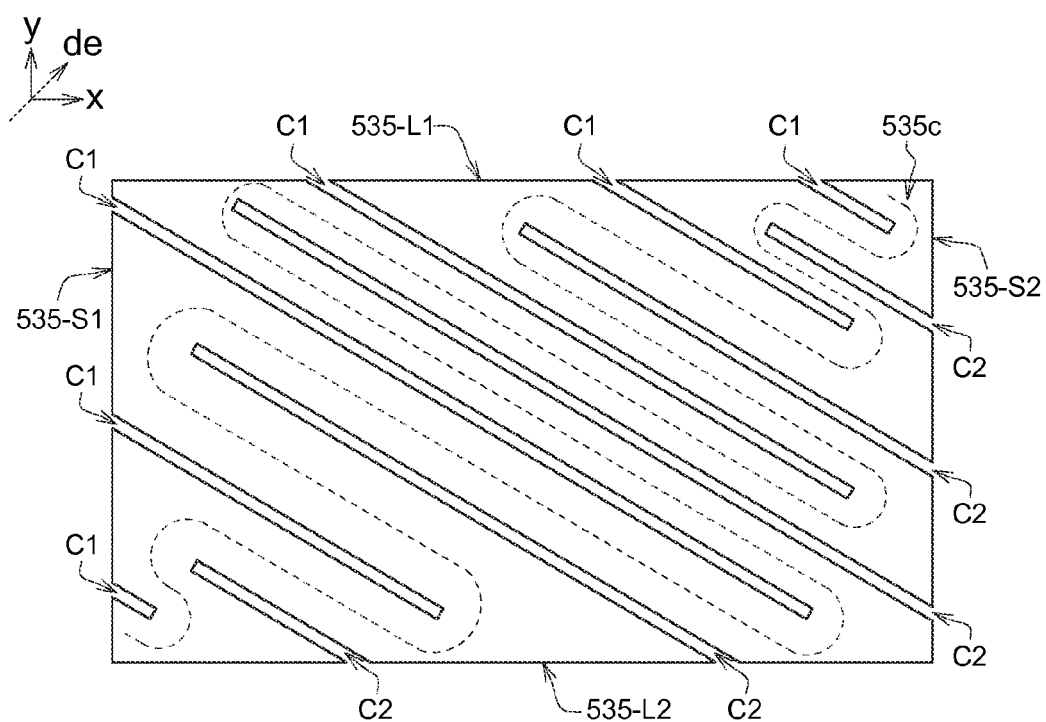
FIG. 6B illustrates a simple configuration of the channels formed by the disconnecting points of the sensing electrodes of FIG. 6A.

FIG. 6A is a top view of a pattern of sensing electrodes according to one embodiment of the disclosure. FIG. 6B illustrates a simple configuration of the channels formed by the disconnecting points of the sensing electrodes of FIG. 6A. As shown in FIG. 6A, the third electrode layer 535 comprises a plurality of first sensing lines 535$x$ and a plurality of second sensing lines 535$y$ coupled to each other, and the first and second sensing lines are respectively extended along x-direction and y-direction on a xy-plane to form a sensing grid, wherein a plurality of crossing points of the first sensing lines 535$x$ and the second sensing lines 535$y$ comprises a plurality of disconnecting points 535$p$. Please refer to FIG. 6A and FIG. 6B, the disconnecting points 535$p$ are aligned to form a plurality of first channels C1 and a plurality of second channels C2. The first channels C1 and the second channels C2 are parallel to each other and tilted to the x-direction at an oblique angle, the first channels C1 are aligned towards the second channels C2, and the first channels C1 and the second channels C2 are arranged alternately (ex: as an interdigitated arrangement). In one embodiment, positions of the disconnecting points of the first channels C1 start from a first long side 535-L1 and a first short side 535-S1 of the sensing grid (i.e. the sensing electrode 535), and positions of the disconnecting points of the second channels C2 start from a second short side 535-S2 and a second long side 535-L2 of the sensing grid (i.e. the sensing electrode 535). The sensing grid of the sensing electrode 535 comprises a continuous portion between the first channels C1 and the second channels C2, and the continuous portion 535$c$ shows a zigzag pattern, as indicated by the dashed lines of FIG. 6B. An extending direction of the continuous portion 535$c$ (i.e. the direction of de shown in FIG. 6A and FIG. 6B) is tilted to the extending direction of the first channels C1 and the second channels C2 at an angle.

According to the descriptions above, the embodied display apparatus with touch sensor provides two layers of driving electrodes and one layer of sensing electrodes respectively functioning as the driving end and the receiving end of the touch-sensing module. In the embodiment, each of the first electrode layer 231/331/431 (the first driving electrodes A1·A2·A3·A4 . . . An) and the second electrode layer 233/333/433 (the second driving electrodes B1·B2·B3·B4 . . . Bm) outputs an identifiable signal, and the third electrode layer 235/335/435 (the sensing electrode C) receives the outputs from the first driving electrodes A1·A2·A3·A4 . . . An and the second driving electrodes B1·B2·B3·B4 . . . Bm. At the same touch point, there is a clear signal differences between touch and un-touch states. When the touch-sensing surface of the embodied display apparatus is touched, the controlling module is able to identify the touch point from the signal differences. For example, when the touch-sensing surface of the embodied display apparatus is in the un-touch state, the first driving electrodes A1·A2 A3·A4 . . . An and the second driving electrodes B1·B2·B3·B4 . . . Bm respectively output a first signal and a second signal. When the touch-sensing surface of the embodied display apparatus is in the touch state such as one or more fingers touching the screen at one time, the first and second signals change, and a processing unit of the controlling module analyses the changed signals to transfer into the relative x and y coordinates of single or multiple touch points, thereby determining the contact patch point(s) (or area).

In one embodiment, the identifiable signals outputted by the first driving electrodes A1·A2·A3·A4 . . . An and the second driving electrodes B1 B2·B3·B4 . . . Bm can be single or multiple pulses, frequencies, phases, sine waves, triangular waves, or modulated signals, or a mathematical combination of signals (such as orthogonal code . . . etc.). There is no particular limitation to the signal forms in the disclosure. For example, one of the applicable detecting methods is implemented by setting Freq-A1 as the signal A1 and Freq-B2 as the signal B2, and the detected signal strengths are respectively AmpA1 and Amp B 2 when the embodied display apparatus is un-touched. When the embodied display apparatus is touched, the signal strengths of the signal A1 and the signal B2 are changed to AmpA1' and AmpB2'. After a processing unit of the controlling module analyses the changed signals, it can be determined that the crossing point of A1 and B2 is the touch point, and the relative x and y coordinates of the touch point can be acquired.

Additionally, the first driving electrodes A1·A2·A3·A4 . . . An and the second driving electrodes B1·B2·B3·B4 . . . Bm can be driven simultaneously. Alternatively, the first driving electrodes A1·A2·A3·A4 . . . An are driven simultaneously, and the second driving electrodes B1·B2·B3·B4 . . . Bm are driven by a time-sharing scheme. Alternatively, both of the first driving electrodes A1·A2·A3·A4 . . . An and the second driving electrodes B1·B2 B3·B4 . . . Bm can be driven in the time-sharing scheme. There is no particular limitation to the driving methods in the disclosure. If the first driving electrodes and the second driving electrodes are driven simultaneously, the sensing electrodes C receive signals simultaneously. If the first driving electrodes and the second driving electrodes are driven in a time-sharing scheme, the sensing electrodes C receive signals sequentially.

Compared to the conventional touch-sensing module including several receivers, only one receiver (i.e. the sensing electrodes C electrically connected to each other) is required for the display apparatus with touch sensor according to the embodiment of the disclosure to receive signals. Moreover, the display apparatus with touch sensor according to the embodiment provides a structure including electrodes in three axes, the relative x and y coordinate of one or more the touch points can be rapidly determined by the controlling module due to the design of the first and second driving electrodes, which simplifies the signal analysis, calculations and coordinate transformations.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A display apparatus with touch sensor, comprising:
a display module, at least comprising a first substrate, a second substrate and a display medium layer disposed between the first substrate and the second substrate; and
a touch-sensing module coupled to the display module, the touch-sensing module comprising:
a first electrode layer, comprising a plurality of first driving electrodes arranged along a first direction;
a second electrode layer, comprising a plurality of second driving electrodes arranged along a second direction, and the first direction and the second direction being intersected; and
a third electrode layer, comprising a plurality of sensing electrodes electrically connected to each other, wherein the first electrode layer, the second electrode layer and the third electrode layer are positioned between the first substrate and the second substrate;
wherein the third electrode layer comprises a plurality of first sensing lines and a plurality of second sensing lines coupled to each other, and the first and second sensing lines are respectively extended along x-direction and y-direction on a xy-plane to form a sensing grid, wherein a plurality of crossing points of the first sensing lines and the second sensing lines comprises a plurality of disconnecting points, and the disconnecting points are aligned to form a plurality of first channels and a plurality of second channels.

2. The display apparatus with touch sensor according to claim 1, wherein the first direction is perpendicular to the second direction.

3. The display apparatus with touch sensor according to claim 1, wherein the touch-sensing module comprises a base plate positioned at one side of the display module.

4. The display apparatus with touch sensor according to claim 3, wherein the first electrode layer, the second electrode layer and the third electrode layer are positioned at the same side of the base plate.

5. The display apparatus with touch sensor according to claim 3, wherein two and the remaining one of the first electrode layer, the second electrode layer and the third electrode layer are positioned at different sides of the base plate.

6. The display apparatus with touch sensor according to claim 3, wherein the first electrode layer and the second electrode layer are positioned at one side of the base plate, and the third electrode layer is positioned at the other side of the base plate.

7. The display apparatus with touch sensor according to claim 1, wherein the first electrode layer, the second electrode layer and the third electrode layer are positioned at a rear side of the second substrate, which is opposite to the other side of the second substrate facing the display medium layer.

8. The display apparatus with touch sensor according to claim 1, wherein the first electrode layer and the second electrode layer are positioned between the first substrate and the second substrate.

9. The display apparatus with touch sensor according to claim 8, wherein the third electrode layer is positioned at a rear side of the second substrate.

10. The display apparatus with touch sensor according to claim 9, wherein the display module further comprises a shielding layer, and the third electrode layer is formed at the shielding layer.

11. The display apparatus with touch sensor according to claim 8, wherein the display module further comprises a conductive layer positioned between the first substrate and the second substrate, and the conductive layer comprises the first electrode layer and the second electrode layer.

12. The display apparatus with touch sensor according to claim 11, wherein the conductive layer is made of metal or indium tin oxide (ITO).

13. The display apparatus with touch sensor according to claim 8, wherein the first driving electrodes of the first electrode layer and a plurality of data lines of the display module are positioned at the same layer, while the second driving electrodes of the second electrode layer and a plurality of gate lines of the display module are positioned at the same layer.

14. The display apparatus with touch sensor according to claim 1, wherein the first driving electrodes of the first electrode layer and a plurality of data lines of the display module are positioned at the same layer, while the second driving electrodes of the second electrode layer and a plurality of gate lines of the display module are positioned at the same layer.

15. The display apparatus with touch sensor according to claim 1, wherein the sensing electrodes of the third electrode layer and a common electrode layer of the display module are positioned at the same layer.

16. The display apparatus with touch sensor according to claim 1, wherein the first driving electrodes and the second driving electrodes respectively output a first signal and a second signal while the display apparatus is in an un-touch state; when the display apparatus is touched at one point or multiple points, the first and second signals change, and a processing unit is capable of identifying and determining relative coordinates of said single or multiple points.

17. The display apparatus with touch sensor according to claim 1, wherein the first driving electrodes and the second driving electrodes are driven simultaneously, and the sensing electrodes receive corresponding signals substantially simultaneously.

18. The display apparatus with touch sensor according to claim 1, wherein the first driving electrodes and the second driving electrodes are driven by a time-sharing scheme and the sensing electrodes sequentially receive corresponding signals.

19. The display apparatus with touch sensor according to claim 1, wherein the sensing electrodes are arranged along a third direction.

20. The display apparatus with touch sensor according to claim 1, wherein the first channels and the second channels are parallel to each other and tilted to the x-direction at an oblique angle, the first channels are aligned towards the second channels, and the first channels and the second channels are arranged alternately.

21. The display apparatus with touch sensor according to claim 20, wherein positions of the disconnecting points of the first channels start from a first long side and a first short side of the sensing grid, and positions of the disconnecting points of the second channels start from a second long side and a second short side of the sensing grid.

22. The display apparatus with touch sensor according to claim 1, wherein the sensing grid comprises a continuous portion between the first channels and the second channels, and the continuous portion shows a zigzag pattern.

23. The display apparatus with touch sensor according to claim 1, wherein the first substrate and the second substrate are a thin film transistor (TFT) substrate and a color filter substrate respectively, and the display medium layer is a liquid crystal layer.

\* \* \* \* \*